(12) United States Patent
Kane et al.

(10) Patent No.: US 11,586,701 B2
(45) Date of Patent: Feb. 21, 2023

(54) LOW-POWER ADDER CIRCUIT

(71) Applicant: Google LLC, Mountain View, CA (US)

(72) Inventors: Anand Suresh Kane, Santa Clara, CA (US); Ravi Narayanaswami, San Jose, CA (US)

(73) Assignee: Google LLC, Mountain View, CA (US)

( * ) Notice: Subject to any disclaimer, the term of this patent is extended or adjusted under 35 U.S.C. 154(b) by 137 days.

(21) Appl. No.: 17/063,813

(22) Filed: Oct. 6, 2020

(65) Prior Publication Data

US 2021/0019361 A1    Jan. 21, 2021

Related U.S. Application Data

(63) Continuation of application No. 16/159,450, filed on Oct. 12, 2018, now Pat. No. 10,824,692.

(51) Int. Cl.
*G06F 7/485* (2006.01)
*G06F 17/10* (2006.01)
*G06F 7/50* (2006.01)
*G06N 3/063* (2023.01)

(52) U.S. Cl.
CPC ............... *G06F 17/10* (2013.01); *G06F 7/485* (2013.01); *G06F 7/50* (2013.01); *G06N 3/063* (2013.01)

(58) Field of Classification Search
CPC ....................................................... G06F 7/485
See application file for complete search history.

(56) References Cited

U.S. PATENT DOCUMENTS

| | | | |
|---|---|---|---|
| 5,808,926 | A | 9/1998 | Gorshtein et al. |
| 6,088,715 | A | 7/2000 | Oberman |
| 9,317,478 | B2 | 4/2016 | Swartzlander, Jr. et al. |

(Continued)

FOREIGN PATENT DOCUMENTS

| | | |
|---|---|---|
| TW | 200630871 | 9/2006 |
| TW | 200951806 | 12/2009 |

(Continued)

OTHER PUBLICATIONS

Oberman et al. "Reducing the Mean Latency of Floating-point Addition," Theoretical Computer Science, vol. 196, Apr. 6, 1998, 14 pages.

(Continued)

*Primary Examiner* — Chuong D Ngo
(74) *Attorney, Agent, or Firm* — Fish & Richardson P.C.

(57) ABSTRACT

Methods, systems, and apparatus, including computer programs encoded on a computer storage medium, for a circuit configured to add multiple inputs. The circuit includes a first adder section that receives a first input and a second input and adds the inputs to generate a first sum. The circuit also includes a second adder section that receives the first and second inputs and adds the inputs to generate a second sum. An input processor of the circuit receives the first and second inputs, determines whether a relationship between the first and second inputs satisfies a set of conditions, and selects a high-power mode of the adder circuit or a low-power mode of the adder circuit using the determined relationship between the first and second inputs. The high-power mode is selected and the first and second inputs are routed to the second adder section when the relationship satisfies the set of conditions.

17 Claims, 4 Drawing Sheets

(56) References Cited

U.S. PATENT DOCUMENTS

| | | | |
|---|---|---|---|
| 9,607,330 | B2 | 3/2017 | Spitz et al. |
| 10,481,869 | B1 * | 11/2019 | Wang .................. G06F 7/487 |
| 2005/0210095 | A1 | 9/2005 | Lutz et al. |
| 2006/0206556 | A1 | 9/2006 | Lutz et al. |
| 2016/0124905 | A1 | 5/2016 | Lutz et al. |

FOREIGN PATENT DOCUMENTS

| | | |
|---|---|---|
| TW | 201327375 | 7/2013 |
| TW | 201638717 | 11/2016 |
| TW | 201842441 | 12/2018 |

OTHER PUBLICATIONS

PCT International Search Report and Written Opinion in International Appln. No. PCT/US2019/055871, dated Jan. 17, 2020, 13 pages.

TW Office Action in Taiwan Application No. 110120955, dated Aug. 13, 2021, 6 pages (with English translation).

PCT International Preliminary Report on Patentability in International Appln. No. PCT/US2019/055871, dated Apr. 22, 2021, 8 pages.

TW Office Action in Taiwan Application No. 108136884, dated Nov. 27, 2020, 22 pages (with English translation).

\* cited by examiner

```
┌─────────────────────────────────────────────────────────────────┐
│ RECEIVE FIRST AND SECOND INPUTS WHERE INPUTS ARE ROUTED BASED ON│
│ FIRST INPUT BEING LARGER IN MAGNITUDE THAN SECOND INPUT         │
│                                                             302 │
└─────────────────────────────────────────────────────────────────┘
                                  ↓
┌─────────────────────────────────────────────────────────────────┐
│ DETERMINE WHETHER RELATIONSHIP BETWEEN FIRST AND SECOND INPUTS  │
│ SATISFIES A SET OF CONDITIONS                                   │
│                                                             304 │
└─────────────────────────────────────────────────────────────────┘
                                  ↓
┌─────────────────────────────────────────────────────────────────┐
│ SELECT A LOW-POWER MODE OF THE ADDER CIRCUIT OR A HIGH-POWER    │
│ MODE OF THE ADDER CIRCUIT BASED ON A DETERMINED RELATIONSHIP    │
│ BETWEEN THE FIRST AND SECOND INPUTS                             │
│                                                             306 │
└─────────────────────────────────────────────────────────────────┘
                                  ↓
┌─────────────────────────────────────────────────────────────────┐
│ PROVIDE FIRST AND SECOND INPUTS TO AT LEAST ONE OF A FIRST OR   │
│ SECOND ADDER SECTION OF THE ADDER CIRCUIT BASED ON THE          │
│ DETERMINED RELATIONSHIP                                         │
│                                                             308 │
└─────────────────────────────────────────────────────────────────┘
                                  ↓
┌─────────────────────────────────────────────────────────────────┐
│ FIRST ADDER SECTION RECEIVES FIRST AND SECOND INPUTS TO         │
│ GENERATE A FIRST SUM USING THE LOW-POWER MODE                   │
│                                                             310 │
└─────────────────────────────────────────────────────────────────┘
                                  ↓
┌─────────────────────────────────────────────────────────────────┐
│ SECOND ADDER SECTION RECEIVES FIRST AND SECOND INPUTS TO        │
│ GENERATE A SECOND SUM WHEN THE RELATIONSHIP BETWEEN THE FIRST   │
│ AND SECOND INPUTS SATISFY THE SET OF CONDITIONS                 │
│                                                             312 │
└─────────────────────────────────────────────────────────────────┘
```

LOW-POWER ADDER CIRCUIT

CROSS-REFERENCE TO RELATED APPLICATION

This application is a continuation of U.S. application Ser. No. 16/159,450, filed on Oct. 12, 2018, the contents of which are incorporated by reference herein.

This application is related to U.S. patent application Ser. No. 16/113,410, filed on Aug. 27, 2018. The entire disclosure of U.S. patent application Ser. No. 16/113,410 is incorporated herein by reference in its entirety.

BACKGROUND

This specification relates to hardware circuits for performing mathematical computations.

Computational circuits can include multiple adder circuits that are used to add numerical inputs such as integers and floating-point numbers. Adder circuits can be expensive to procure and integrate into an existing computing circuit and some adder circuits are not efficiently sized for certain applications. These circuits can consume a substantial area of a circuit die but provide no advantage in computing throughput despite their large size. Adder circuits that are oversized for certain computing applications can cause inefficiencies in power consumption and utilization.

A hardware circuit can be used to implement a neural network. A neural network having multiple layers can be used to compute inferences using a computational circuit that includes multiple adder circuits. Computational circuitry of the hardware circuit can also represent a computation unit that is used to perform neural network computations for a given layer. For example, given an input, the neural network can compute an inference for the input by performing dot product operations using one or more of the multiple adders in a computation unit of the hardware circuit.

SUMMARY

This document describes a special-purpose hardware circuit for adding multiple inputs. The hardware circuit includes a first adder section that receives a first input and a second input and generates a first sum in response to adding the inputs. The circuit also includes a second adder section that can receive the first and second inputs and generate a second sum using the inputs. An input processor of the hardware circuit receives the first and second inputs, determines whether a relationship between the first and second inputs satisfies a set of conditions, and selects a low-power mode of the adder circuit or a high-power mode of the adder circuit based on the determined relationship between the first and second inputs.

The circuit is configured leverage certain sign and exponent attributes of the inputs such that the low-power mode is selected more frequently for adding the inputs and at a much higher rate than the high-power mode. The high-power mode is selected only infrequently when particular set of conditions is satisfied. Hence, the first and second inputs are routed to the second adder section when the relationship between the first and second inputs satisfies the set of conditions, otherwise the input processor selects the low-power mode of the adder circuit.

One aspect of the subject matter described in this specification can be embodied in an adder circuit for adding multiple inputs. The adder circuit includes: an input processor configured to: receive a first input and a second input; determine whether a relationship between the first input and the second input satisfies a set of conditions; select a high-power mode of the adder circuit and route the first and second inputs to a first, high-power adder section when the relationship between the first and second inputs satisfies the set of conditions; and select a low-power mode of the adder circuit and route the first and second inputs to a second, low-power adder section when the relationship between the first and second inputs does not satisfy the set of conditions.

These and other implementations can each optionally include one or more of the following features. For example, in some implementations, the first, high-power adder section is configured to receive the first and second inputs and generate a first sum of the first and second inputs; and the second, low-power adder section is configured to receive the first and second inputs and generate a second sum of the first and second inputs.

In some implementations, the adder circuit further includes: a selection multiplexor configured to: pass the first sum as an output of the adder circuit when the input processor selects the low-power mode of the adder circuit; and pass the second sum as the output of the adder circuit when the input processor selects the high-power mode of the adder circuit.

In some implementations, when the low-power mode is selected the adder circuit uses only the second, low-power adder section to add the first and second inputs; and when the high-power mode is selected the adder circuit toggles both the first, high-power adder section and the second, low-power adder section when adding the first and second inputs.

In some implementations, when the low-power mode is selected and the adder circuit uses only the second, low-power adder section to add the first and second inputs, the adder circuit consumes less power than when the high-power mode is selected, because using only the second, low-power adder section to add the first and second inputs requires fewer circuit toggles than toggling both the first, high-power adder section and the second, low-power adder section to add the first and second inputs.

In some implementations, the input processor is further configured to: generate a first parameter signal based on the determined relationship between the first and second inputs, the first parameter signal indicating a selected mode of the adder circuit.

In some implementations, the adder circuit further includes: a mode detector configured to: detect a particular mode of the adder circuit; and generate a control signal to control the second, low-power adder section based on a detected mode of the adder circuit.

In some implementations, the adder circuit further includes an input routing engine included at the input processor, the input routing engine being configured to: determine that the first input is greater in magnitude than the second input before the input processor determines whether the relationship between the first input and the second input satisfies the set of conditions; and in response to determining that the first input is greater in magnitude than the second input, switching the first input from being routed to a second input port of the adder circuit, that receives the smaller of two inputs, to being routed to a first input port of the adder circuit that receives the larger of two inputs.

In some implementations, the set of conditions is satisfied in response to the input processor determining that: a sign of the first input is not the same as a sign of the second input;

and a computed difference between an exponent value of the first input and an exponent value of the second input is less than or equal to 1.

In some implementations, the input processor is further configured to: determine whether a sign of the first input is different than a sign of the second input; and in response to determining that the sign of the first input is different than the sign of the second input, perform a complement operation on the first input or the second input using the second, low-power adder section.

In some implementations, the adder circuit further includes: a zero-input generator configured to: provide a plurality of zero inputs to the first, high-power adder section in response to determining that the relationship between the first input and the second input does not satisfy the set of conditions.

In some implementations, the second, low-power adder section is: (i) located along a second data path of the adder circuit; (ii) coupled to the input processor along the second data path of the adder circuit; and (iii) coupled to the selection multiplexor along the second data path of the adder circuit.

In some implementations, the first, high-power adder section is: (i) located along a first data path of the adder circuit; (ii) coupled to the input processor along the first data path of the adder circuit; and (iii) coupled to the selection multiplexor along the first data path of the adder circuit.

One aspect of the subject matter described in this specification can be embodied in a method for adding inputs using an adder circuit. The method includes, receiving, by an input processor of the adder circuit, a first input and a second input; determining, by the input processor, that a relationship between the first input and the second input does not satisfy a set of conditions; selecting, using the input processor and based on a determined relationship between the first and second inputs, a low-power mode of the adder circuit for adding the inputs; providing, by the input processor and based on a selected mode of the adder circuit, the first and second inputs to first, low-power adder section of the adder circuit that corresponds to the low-power mode; and generating, by the first, low-power adder section, a first sum of the first and second inputs using the low-power mode of the adder circuit that is selected when the relationship between the first and second inputs does not satisfy the set of conditions.

These and other implementations can each optionally include one or more of the following features. For example, in some implementations, the method further includes: passing, by a selection multiplexor of the adder circuit, the first sum as an output of the adder circuit when the input processor selects the low-power mode of the adder circuit; and passing, by the selection multiplexor, a second sum as the output of the adder circuit when the input processor selects a high-power mode of the adder circuit.

In some implementations, when the low-power mode is selected the adder circuit uses only the first, low-power adder section to add the first and second inputs; and when a high-power mode of the adder circuit is selected the adder circuit toggles both the first, low-power adder section and a second, high-power adder section when adding the first and second inputs.

In some implementations, selecting the low-power mode and using only the first, low-power adder section to add the first and second inputs causes the adder circuit to consume less power than when the high-power mode is selected and the adder circuit toggles both the first, low-power adder section and the second, high-power adder section when adding the first and second inputs.

In some implementations, the method further includes: generating, by the input processor, a first parameter signal based on the determined relationship between the first and second inputs, the first parameter signal indicating the selected mode of the adder circuit.

In some implementations, the method further includes: detecting, by a mode detector of the adder circuit, the particular mode of the adder circuit; and generating, by the mode detector, a control signal to control the first, low-power adder section based on a detected mode of the adder circuit.

In some implementations, the method further includes: determining, using an input routing engine included at the input processor, that the first input is greater in magnitude than the second input before the input processor determines whether the relationship between the first and second inputs satisfies the set of conditions; and in response to determining that the first input is greater in magnitude than the second input, switching, using the input routing engine, the first input from being routed to a second input port of the adder circuit, that receives the smaller of two inputs, to being routed to a first input port of the adder circuit that receives the larger of two inputs.

In some implementations, the set of conditions is satisfied in response to the input processor determining that: a sign of the first input is the same as a sign of the second input; and a computed difference between an exponent value of the first input and an exponent value of the second input is not less than or equal to 1.

In some implementations, the method further includes: determining, using the input processor, whether a sign of the first input is different than a sign of the second input; and in response to determining that the sign of the first input is different than the sign of the second input, performing a complement operation on the first input or the second input using the first, low-power adder section.

In some implementations, the method further includes: generating, by the second, high-power adder section, the second sum of the first and second inputs using the high-power mode of the adder circuit that is selected when the input processor determines that the relationship between the first and second inputs satisfies the set of conditions.

Other implementations of this and other aspects include corresponding systems, apparatus, and computer programs, configured to perform the actions of the methods, encoded on computer storage devices (e.g., non-transitory machine-readable storage mediums). A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments to realize one or more of the following advantages. The described techniques can be used to implement a special-purpose hardware circuit for adding multiple inputs while requiring less power than conventional circuits that are used to add inputs. Components of the hardware circuit described in this document can form a low-power adder circuit that efficiently adds multiple inputs (e.g., floating-point inputs) based on a dual path hardware configuration.

When a low-power mode is selected a first data path of the circuit is used to add the inputs, and when a high-power mode is selected a second data path of the circuit is used to add the inputs. The hardware adder circuit is configured such that the low-power mode is selected to add the inputs at a substantially higher rate, i.e., much more frequently, than the high-power mode. This feature of the adder circuit leads to reduced power consumption at the circuit relative to conventional circuits that are used to add inputs, i.e., because most adds are completed in a low-power mode that consumes much less power than conventional adder circuits.

The special-purpose hardware circuit can be configured as a low-power floating-point adder circuit. This low-power adder circuit can be optimized for adding two floating-point inputs with reduced power requirements based on at least the split data path configuration that leverages the first data path of the lower-power mode to generate a sum of adding two floating-point inputs. In some implementations, the floating-point inputs are each 32-bit floating-point inputs (standard precision) or 16-bit floating-point inputs that use a reduced precision floating-point format.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In an example implementation, a hardware circuit can be used to implement a multi-layer neural network and perform computations (e.g., neural network computations) by processing the input through each of the layers of the neural network. In particular, individual layers of the neural network can each have a respective set of parameters. Each layer receives an input and processes the input in accordance with the set of parameters for the layer to generate an output based on computations that are performed using one or more adder circuits of an example computation unit. For example, the neural network layer can sum multiple inputs as part of computing a matrix multiplication of an input array by a parameter array or as part of computing a convolution between an input array and a parameter kernel array.

In general, processing an input through a layer of a neural network is accomplished by performing mathematical operations, e.g., multiplication and addition. A hardware circuit can include multiple adder circuits for performing mathematical computations. The adder circuits can be grouped to form a computation unit, e.g., for a matrix or vector processing unit, of the hardware circuit. The computation unit is used to add numerical inputs such as integers and floating-point numbers when the hardware circuit as part of performing neural network computations, e.g., matrix-vector multiplications, associated with processing an input through a layer of a neural network.

This document describes techniques for implementing a special-purpose hardware adder circuit that is configured to add inputs while consuming less power relative to conventional adder circuits. The adder circuit is configured as a two-mode dual-path adder circuit and includes an input processor that selects a particular mode of the circuit in response to determining whether a relationship between a first input and a second input satisfies a set of conditions. The set of conditions is satisfied in response to the input processor determining that: i) a sign of the first input is different than a sign of the second input; and ii) a computed difference between an exponent value of the first input and an exponent value of the second input is less than or equal to one.

Figure 1:
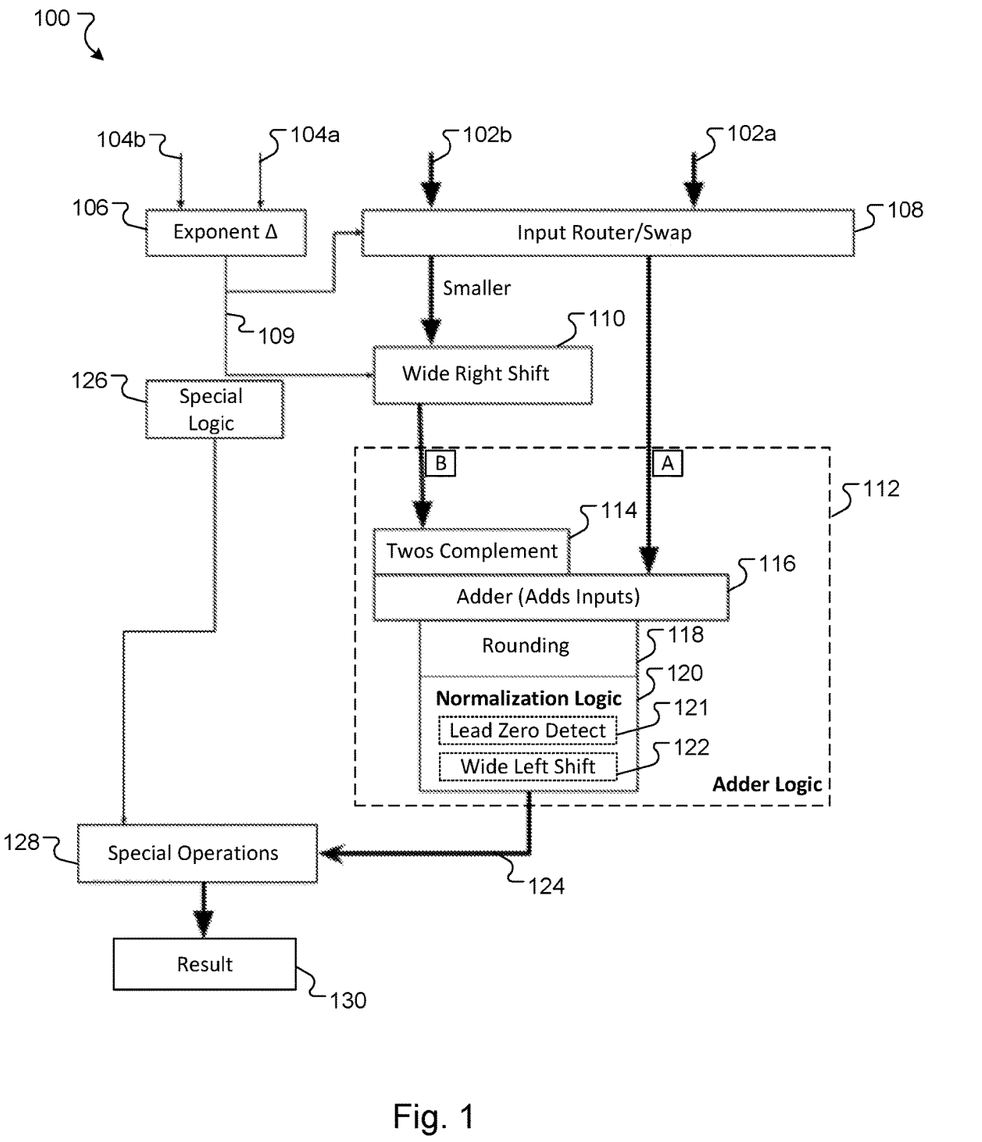
FIG. 1 shows a diagram of an example hardware circuit for performing computations.

FIG. 1 shows a diagram of an example hardware circuit 100 for performing computations. Hardware circuit 100 can represent a circuit that is used to add two inputs. In some implementations, the inputs are each floating-point numbers that are represented in software as a 32-bit data structure. Scale engine 106 corresponds to a component that uses delta logic to determine a difference between a scale of first input 102a and second input 102b. In some implementations, a respective scale of each input is represented by an exponent value of each input. For example, a first input 102a can have a value of $3.35(2\times10^7)$, where the exponent value of 7 corresponds to the scale of the input 102a. Likewise, a second input 102b can have a value of $1.65(2\times10^3)$, where the exponent value of 3 corresponds to the scale of the input 102b. Scale engine 106 is configured to receive a first exponent 104a and a second exponent 104b and determine a delta or difference between the respective exponent values 104a and 104b.

Significand swap 108 corresponds to input swapping logic that is used to swap or route respective inputs to a particular input port, A or B, of an example hardware adder 112 included at the circuit 100. The significand swap 108 routes an input to a particular input port of the circuit 100 based on a size, as indicated by a magnitude or scale, of the input as indicated by a data value of the input. For example, significand swap 108 can analyze the 32-bit data structure of each input 102a, 102b to determine which input is the larger input. In some implementations, significand swap 108 determines that one input has a numerical data value that is larger than a numerical data value of another input based on a respective exponent value of each input.

A control signal 109 generated by scale engine 106 can be used by significand swap 108 to determine that a respective exponent value 104a of input 102a is greater than a respective exponent value 104b of input 102b. Based on this determination, significand swap 108 causes input 102a (e.g., the larger input) to be routed to input port, A, and input 102b (e.g., the smaller input) to be routed to input port, B. In general, input 102a represents an input that has the larger data value, while input 102b represents an input that has the smaller data value. Routing the inputs to a particular input port (A or B) of hardware adder 112 can include swapping an input from input port A to input port B, and vice versa.

In some cases, routing the inputs 102a, 102b to respective input ports A, B of adder 112, can include using shift logic 110 to perform a shift operation on an input that is determined to be the smaller input, e.g., based on the respective exponent value 104b of input 102b. For example, the shift operation can be triggered in response to shift logic 110 receiving a control signal 109 provided by scale engine 106. The control signal 109 can be used to trigger the shift operation on input 102b to perform a right shift (e.g., a wide right shift) prior to circuit 100 using adder 112 to add inputs 102a, 102b. In some implementations, because input 102b has an exponent value 104b (e.g., 3) that is smaller than an exponent value 104a (e.g., 7) of input 102a, a wide right shift may be performed to align the respective decimal points of each input before circuit 100 uses adder 112 to add the inputs 102a, 102b.

Hardware adder 112 includes multiple logic blocks that each represent a respective logic function of the adder 112. In general, one or more of the respective logic functions may be used to add the inputs 102a, 102b. For example, complement logic 114 is used to generate a two's complement version of the input 102b using binary data of a data structure (e.g., 32-bit data structure) that represents the data value of input 102b. The complement logic 114 is used to generate a two's complement version of input 102b in response to determining that a sign of input 102b is different than a sign of input 102a.

For example, each of inputs 102a, 102b can be a respective floating-point number and a sign bit for each input indicates the sign (e.g., positive or negative) of the input and identifies a value of the floating-point number as being greater than zero or less than zero. In general, each numerical input, such as a floating-point number, has at least one sign bit in the data structure that indicates whether the number is greater than zero (e.g., is a positive number) or is less than zero (e.g., is a negative number). In some cases, a data structure uses one or multiple zero bits ("0") to indicate a numerical input that is zero.

In some implementations, a subtraction operation occurs when a positive input 102a that has a larger data value is added with a negative input 102b that has a smaller data value. In this manner, the two's complement version of the negative input 102b is used to perform the addition operation, which involves adding input 102a with the two's complement version of input 102b to generate a preliminary sum or result. Adder 112 performs an addition operation by using adder logic 116 to add inputs 102a, 102b and generate a preliminary sum that is an output of adder logic 116. In some cases, adding the inputs can include using rounding logic 118 to perform a rounding operation on the preliminary sum. For example, the rounding logic 118 can be used to round the preliminary sum to a nearest decimal or integer value.

Normalization logic 120 can be used to perform one or more normalize operations on the preliminary result. In some implementations, the normalization logic 120 can be used to adjust a data format of the preliminary sum before generating an intermediate sum 124. For example, when a wide right shift is performed on input 102b to align a decimal point of that input with a decimal point of input 102a, a subsequent left shift (e.g., a wide left shift) operation can be applied to the preliminary sum. This shift operation of normalization logic 120 causes a decimal point of the final result or sum 130 to be adjusted to the appropriate position based on at least on a scale of the respective inputs 102a, 102b. In some cases, the normalization logic 120 uses a lead zero detector 121 to determine an amount of left shift based on a detected number of leading zeros that is associated with a data value of each input 102a, 102b. For example, the lead zero detector 121 can count a number of zero digits from a left-most position of the respective inputs 102a, 102b, until a first non-zero digit is reached and determine an amount of left shift 122 at least based on the number of zero digits.

Special logic 126 can be used to propagate particular data values that result from certain special operations 128 that may arise during an addition operation. For example, a special operation 128 can involve operands identified as an infinity operand or a NaN (Not a Number) operand. These operations 128 can correspond to certain overflow or underflow conditions. In other implementations, addition operations can generate a preliminary sum that is a negative number as indicated by a sign bit of the preliminary sum. In this instance, an additional two's complement operation may be performed on a preliminary sum based on a sign bit of the preliminary sum. Circuit 100 generates a finalized result or sum 130 based on logic 126 that is used to process intermediate sum 124 to account for one or more special operations 128 that may arise during an addition operation.

Figure 2:
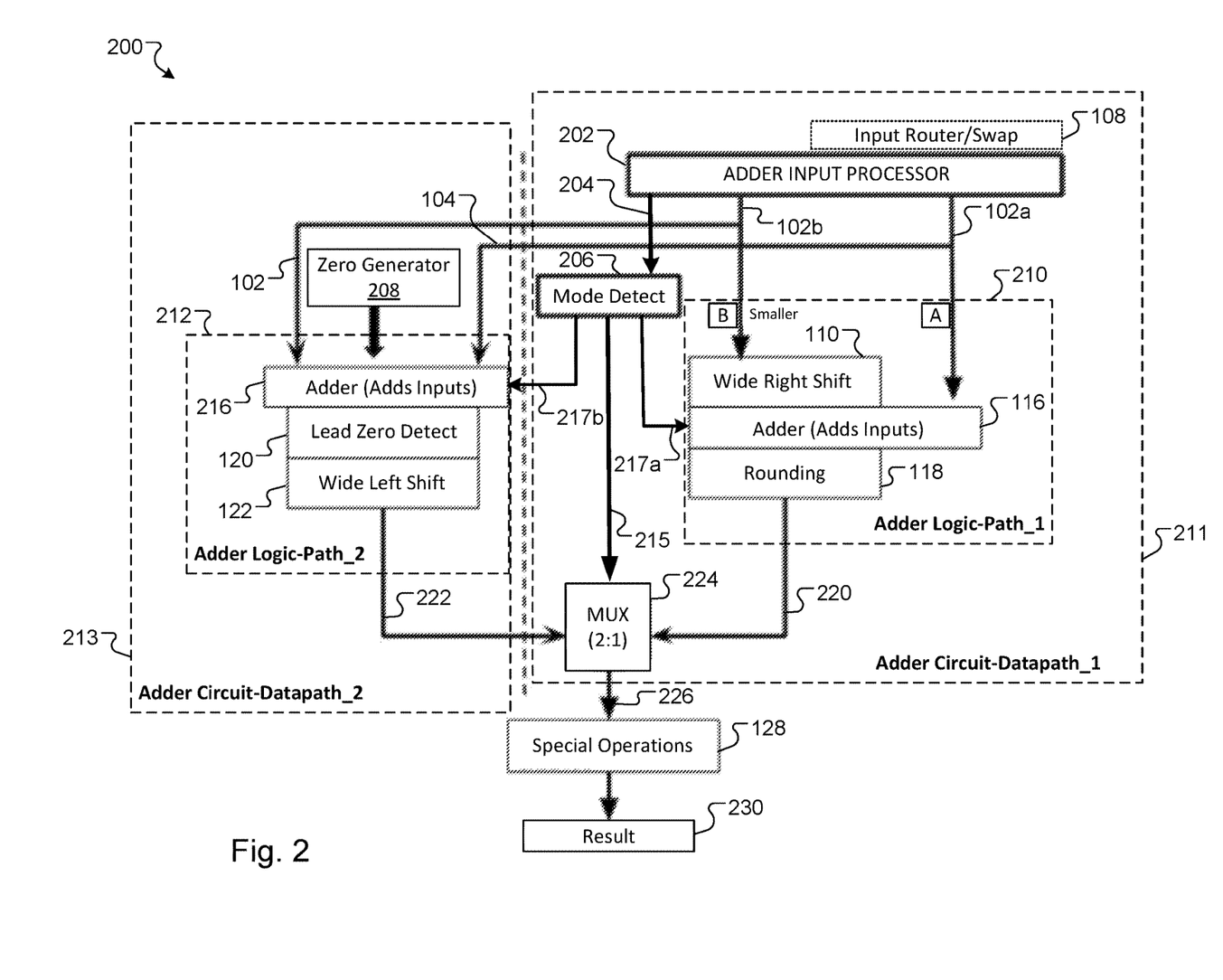
FIG. 2 shows a diagram with hardware circuit components that are arranged to form an example low power adder circuit.

FIG. 2 shows a diagram of an example special-purpose hardware circuit 200. Components of circuit 200 can be arranged to form an example low-power adder circuit that is configured to add inputs while consuming less power relative to conventional adder circuits. In some implementations, the hardware circuit 200 is configured as a low-power floating-point adder circuit. The low-power adder circuit 200 can be optimized for adding two floating-point inputs with reduced power requirements based on two-mode dual-path circuit configuration.

Circuit 200 includes an input processor 202 that generates a parameter signal 204 to indicate a selected mode of the circuit 200. The input processor 202 is configured to select a mode of the adder circuit 200 in response to determining whether a relationship between the first input and the second input satisfies a set of conditions. The set of conditions (described below) is satisfied in response to the input processor determining that: i) a sign of the first input is not the same as a sign of the second input; and ii) a computed difference between an exponent value 104a of a first input 102a and an exponent value 104b of a second input 102a is less than one or equal to one.

Parameter signal 204 is provided to a mode detector 206 that uses the parameter signal 204 to generate one or more controls based on a selected mode of the circuit 200. The mode detector 206 uses the parameter signal 204 to generate a mux control signal 215 and an adder control signal 217a and 217b. In some implementations, mode detector 206 is configured to detect the particular mode of the adder circuit based on a value indicated by parameter signal 204. The control signals 215, 217a, 217b are each described in more detail below.

The adder circuit 200 is configured as a two-mode dual-path adder circuit that has a low-power mode and a high-power mode. When the low-power mode is selected, circuit 200 uses an adder logic 210 along a data path 211 to generate a first sum 220. When the high-power mode is selected, circuit 200 uses adder logic 212 along a data path 213 to generate a second sum 222. In general, the data path 211 can correspond to a low-power adder section of circuit 200 that includes adder logic 210. Similarly, the data path 213 can correspond to a high-power adder section of circuit 200 that includes adder logic 212.

In particular, when the high-power mode is selected, circuit 200 uses the components of adder logic 212 along data path 213 to add the inputs, but still also toggles the components of adder logic 210 along data path 211. For example, when the set of conditions is satisfied to cause selection of the high-power mode and the inputs are routed along data path 213 for adding, circuit 200 still toggles the components of adder logic 210 while concurrently using adder logic 212 to add the inputs. As used in this document, a toggle, circuit toggles, or toggling of a circuit component can correspond to activating or switching components of the circuit (e.g., transistors) to route inputs or control signals at the circuit. In general, activating, toggling, or switching the circuit components causes some amount of power to be consumed at the circuit.

Circuit 200 can be formed by splitting a conventional adder circuit to form two different adder sections, namely, a first adder section that corresponds to a low-power mode and a second adder section that corresponds to a high-power mode. The first adder section is described as a low-power adder section because, when the low-power mode is selected, circuit 200 is configured to use only this low-power section, greater than 90% (e.g., 99%) of the time, to add inputs 102a and 102b. Specifically, when this low-power adder section is used, the second adder section essentially experiences little or no circuit toggles because only zeros are routed along that section when the low-power section is used to add the inputs. Hence, this first adder section of data path 211 represents a low-power adder section of circuit 200.

However, the second adder section is described as a high-power section because, when the high-power mode is selected, circuit 200 is configured to use the second adder section to add the inputs, but to also still toggle components of the first adder section. Hence, selection of the high-power mode causes both adder logic 212 and 210 to experience circuit toggles, thereby increasing the power consumption at circuit 200. So, because both adder sections (e.g., the entire circuit 200) are toggled data path 213 is used to add inputs, the total power consumed at circuit 200 is higher than when only data path 211 is used to add the inputs. However, circuit 200 is configured so that the high-power adder section is rarely used to add the inputs.

Mode detector can use the parameter signal 204 to generate an adder control signal 217a or 217b. Adder control signal 217a is used to control hardware or logic components of the low-power adder section of circuit 200 based on a detected mode of the adder circuit, e.g., when the low-power mode is selected. Similarly, adder control signal 217b is used to control hardware or logic components of the high-power adder section of circuit 200 based on a detected mode of the adder circuit, e.g., when the high-power mode is selected.

The hardware adder circuit 200 can include a selection mux 224 that is configured to: i) pass the first sum 220 as an output 226 of the adder circuit 200 when the input processor 202 selects the low-power mode of the adder circuit 200; and ii) pass the second sum 222 as the output 226 of the adder circuit 200 when the input processor 202 selects the high-power mode of the adder circuit 202. As noted above, the mode detector 206 uses the parameter signal 204 to generate a mux control signal 215. The mux control signal 215 is used to control the selection mux 224 such that a particular sum 220 or 222 is passed as the output 226 of the adder circuit 200 based on the particular mode that is selected by the input processor 202.

The selection mux 224 can be a 2:1 multiplexor that receives two inputs, e.g., first sum 220 and second sum 222, and passes a particular sum as an output 226 of the adder circuit 200 based on a parameter value of the mux control signal 215. Circuit 200 generates a finalized result or sum 230 based on example special logic 126 that is used to process the output 226 to account for one or more special operations 128 that may arise during an addition operation.

Referring again to the set of conditions, given two input numbers 102a and 102b, circuit 200 will need to a perform wide left shift 122 operation only under a condition where: i) the sign of 102a and 102b are not the same; and ii) a difference between the exponents of input 102a and 102b are less than or equal to 1. When these conditions are satisfied, they will necessitate a wide left shift 122 operation at circuit 200. This is because the circuit will be required to perform a two's complement operation to add the inputs 102a, 102b based on the sign bits being different between the two inputs. In this instance, circuit 200 is not required to right shift a given input 102 by more than one, e.g., by more than a decimal value of 1.

In general, based on the attributes of inputs processed at circuit 200, a wide right shift operation 110 will not occur, at the circuit 200, as a concurrent operation with a wide left shift operation 122. Based on this, circuit 200 can be configured to split the adder logic 116 such that a wide right operation 110 occurs at a separate adder logic 210 along data path 211 and a wide left operation 122 occurs at another separate adder logic 212 along data path 213. The adder logic 212 can be configured to use an adder 216 that is substantially similar to the adder 116 except that adder 216 is configured to perform certain small shift operations associated with adding one input 102a/b with a twos complement version of another input 102a/b. As used in this document, the sign of an input 102 and a corresponding exponent value 104 of the input can each correspond to a respective attribute of the input 102.

In some implementations, a sign of the exponent values 104 and/or difference in the exponent values 104 between the two inputs/operands 102 can be used to determine which of the two operands 102a, 102b is the larger or greater operand. As discussed above, circuit 200 is configured to swap or route the inputs 102a, 102b such that a smaller operand 102b is always subtracted from a larger operand 102a, where the data size of the operand is indicated by the respective exponent of the operand. For example, input processor 202 can be configured to include computing logic for significand swap 108, such as input routing or swapping engine. Input processor 202 can use significand swap 108 to: i) cause an input 102a that is larger in scale or magnitude, relative to input 102b, to be routed to input port A; and ii) cause an input 102b that is smaller in scale or magnitude, relative to input 102a, to be routed to input port B.

For example, an input routing engine of circuit 200 can be configured to determine that the first input 102a is greater than the second input 102b. In response to determining that the input 102a is greater than second input 102b, the input routing engine can be configured to swap or switch the first input from being routed to a second input port of the adder circuit (e.g., input port B), that is configured to receive the smaller of two inputs, to a first input port of the adder circuit (e.g., input port A), that is configured to receive the larger of two inputs.

In some implementations, the input routing engine determines that a first input is larger than a second input before the adder circuit 200 determines whether the relationship between the first input and the second input satisfies the set of conditions. In other implementations, the determination that the first input is larger than the second input performed concurrent with, or as part of, determining whether the relationship between the first input and the second input satisfies the set of conditions. In this manner, the adder circuit 200 can be configured to effectively leverage a relationship between the inputs 102a/b to select a low-power mode of the circuit 200 based on the scale and sign of the respective inputs.

For example, when circuit 200 is configured so that input port A of an example significand adder has the larger operand, the circuit guarantees that a sign of the adder output, e.g., the sum or result of adding the inputs, is always positive. In this manner, a two's complement operation can be avoided. So, power savings can be realized by eliminating the need for circuit toggles that typically occur when two's complement logic is used to perform, for example, a subtraction operation involving a positive number and a negative number. Hence, at least one data path 211 of the dual-path circuit 200, that does not require two's complement logic, can be configured to only include adder logic 210 needed to add two numbers that have the same sign, or can be configured to perform a ones complement operation when the two numbers do not have the same sign (described below with reference to FIG. 4). This data path 211 can correspond to a low-power mode of circuit 200 because using the adder logic 210 along this data path 211 requires fewer toggles, thereby resulting in power savings at the hardware circuit 200.

As described in more detail below, input processor 202 selects the low-power mode of the circuit 200 to add inputs, e.g., two floating-point inputs, and generate the first sum 220. In some implementations, certain attributes of the inputs 102a, 102b received at circuit 200 causes the input processor 202 to select the low-power mode at a higher rate (e.g., a substantially higher rate) than the circuit 200 selects the high-power mode.

In some instances, because the input processor 202 selects the low-power mode at the higher rate, circuit 200 can include a zero-input generator 208 that is configured to provide or feed multiple zero inputs to the hardware or logic components of the high-power adder section of circuit 200 in response to the input processor 202 having determined that a relationship between a first input 102a and a second input 102b does not satisfy the set of conditions discussed above. For example, the zero-input generator 208 is configured to feed multiple zero inputs to the high-power adder section of circuit 200 when the low-power mode is selected.

In general, feeding the multiple zero inputs to the high-power adder section of circuit 200 results in a negligible amount of toggles at this section of the circuit, which translates to power savings. Further, the combination of the zero inputs and the higher selection rate of the low-power mode of the circuit contributes to the overall power savings that can be achieved using the specialized adder circuit 200. In this manner, circuit 200 can be configured as a special-purpose low-power hardware adder circuit that requires much less power, relative to conventional circuits, to add floating-point inputs.

For example, assuming a uniform distribution of numerical inputs 102a, 102b, a probability of needing to perform a left shift operation 122 associated with two's complement logic 114 corresponds to a probability of: a) an exponent 104a of input 102a being identical to an exponent 104b of input 102b "OR" a difference between exponent 104a of input 102a and an exponent 104b of input 102b being equal exactly to 1; and b) a sign bit of input 102a is different than a sign bit of input 102b. Here, the OR corresponds to a logic operation used by input processor 202 to determine whether the attributes of inputs 102a, 102b satisfy the set of conditions that represent a probability of needing to perform a left shift operation.

As shown at FIG. 2, special-purpose adder circuit 200 can include two separate integer adders 116, 216 at respective sections of circuit 200, instead of the one adder shown at circuit 100 of FIG. 1. Hence, circuit 200 uses a split data path 211, 213, such that once a decision on which data path to use is selected, there is only a single wide shifter 110 or 122 and adder 116 or 216 in the critical path. Also, there is either a single rounding operation 118 or lead zero detect 120 along a particular data path 211, 213, rather than both as shown at circuit 100.

The data path 213 is used very infrequently compared to a rate at which the low-power data path 211 is used. In some implementations, the data path 213 can have no toggles for more than 99% of the processor cycles that can occur for a given computational sequence. Also, during this sequence the zero generator 208 force zeroes at this high-power adder section during these processor cycles which corresponds to the no (or minimal) toggles that occur during the processor cycles. Due to these reasons, adder circuit 200 can consume significantly less power when compared to a typical adder architecture. For example, the low-power adder circuit 200 can realize up to a 50% reduction in power consumption, relative to a conventional circuit, for a comparable addition operation involving a 32-bit floating point number.

Figure 3:
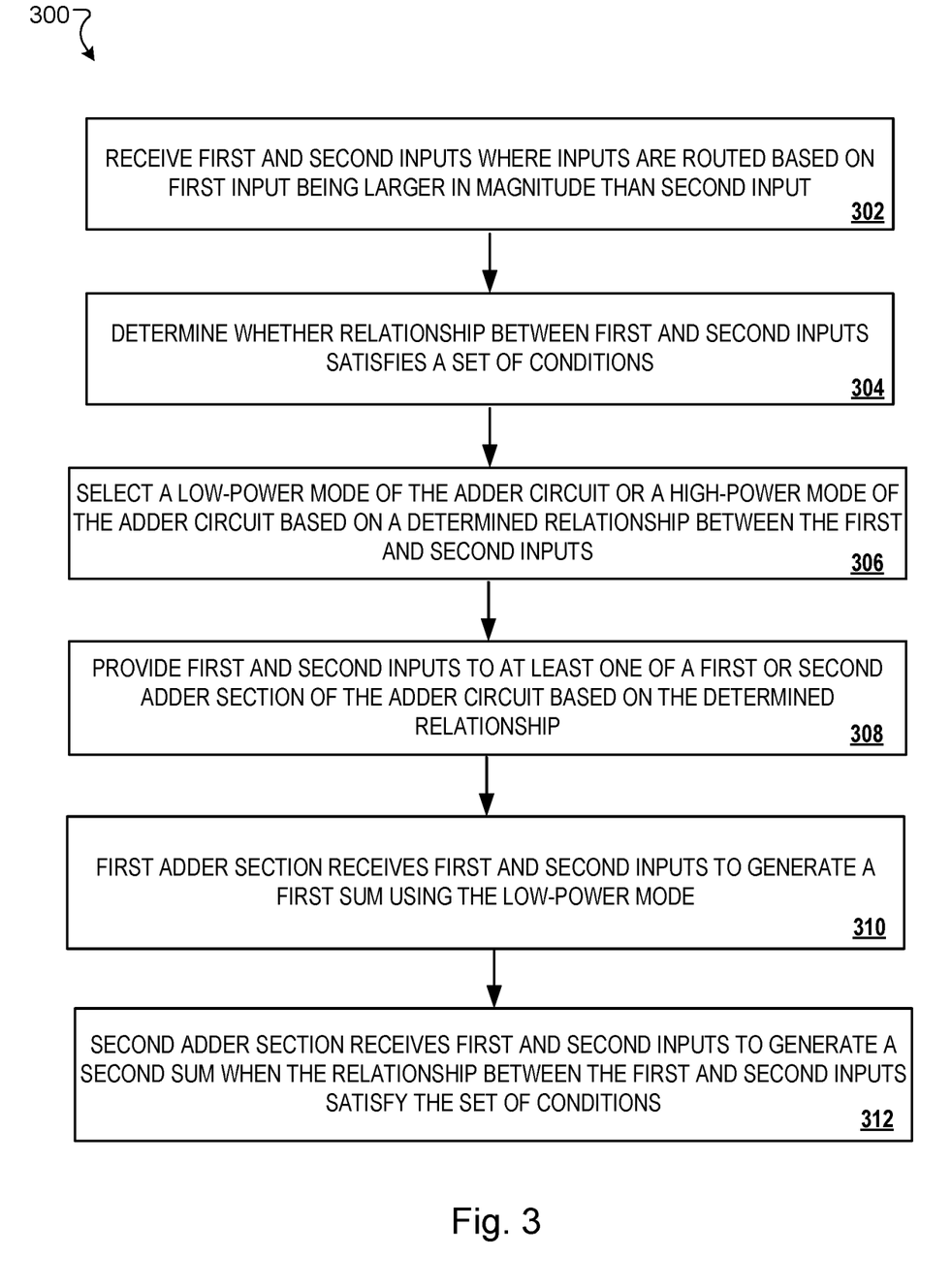
FIG. 3 shows a flowchart of an example process for performing addition operations using the example low power adder circuit of FIG. 2.

FIG. 3 shows a flowchart of an example process 300 for adding at least two inputs. The inputs can be numerical inputs, such as floating-point numbers that are represented as a data structure of bits, e.g., 16-bits or 32-bits. Process 300 can be performed using at least circuit 200 in combination with other circuits, components, and systems described in this document.

Referring now to process 300, circuit 200 receives a first input and a second input, where the first and second inputs are routed at the circuit 200 based on the first input being larger in magnitude than the second input (302). For example, input processor 202 of the low-power adder circuit 200 receives inputs 102a, 102b for routing and adding at the circuit 200 to generate a result 230, e.g., a sum of adding the inputs. The input processor 202 can use significand swap 108 to route and/or swap the first and second inputs so the input that is larger in scale or magnitude is routed to a particular input port of an adder in circuit 200. In some implementations, the special-purpose circuit 200 receives multiple inputs from an external source. The inputs can each be numerical inputs (e.g., floating-point numbers or another data type that includes a sign bit), where each input is represented by a data structure of multiple bits. For example, adder circuit 200 can be generally fed from multipliers or from register files in an example computation unit.

The input processor 202 determines whether a relationship between the first input and the second input satisfies a set of conditions (304). For example, the set of conditions is satisfied in response to the input processor 202 determining that: i) a sign of the input 102a is not the same as a sign of input 102b; and ii) a computed difference between an exponent value 104a of input 102a and an exponent value 104b of input 102b is less than or equal to 1.

Based on a determined relationship between the first and second inputs, the input processor 202 selects a low-power mode of the adder circuit 200 for adding the first and second inputs or a high-power mode of the adder circuit 200 for adding the inputs (306). In some implementations, input processor 202 selects the low-power mode in response to determining that the set of conditions is not satisfied. For example, input processor 202 can select the low-power mode in response to determining that a sign of the input 102a is the same as a sign of input 102b.

Based on the determined relationship between the first and second inputs, the input processor 202 provides the first and second inputs to at least one of a first adder section of the adder circuit 200 that corresponds to the low-power mode or a second adder section of the adder circuit 200 that corresponds to the high-power mode (308). For example, input processor 202 provides the inputs 102a, 102b to at least the low-power adder section along the data path 211 when the low-power mode is selected or provides the inputs 102a, 102b to the high-power adder section when the high-power mode is selected.

In a first implementation, as described above, when the low-power mode is selected the adder circuit 200 uses only adder logic 210 of the low-power adder section to add inputs 102a, 102b. In this first implementation, the selection mux 224 is used to pass the first sum 220 as the output 226 of the adder circuit 200. In a second implementation, when the high-power mode is selected the adder circuit 200 uses the adder logic 212 of the second adder section to add the first and second inputs, but still also toggles components of the adder logic 210 at the first adder section. Because the circuit 200 toggles components of both adder sections, this second implementation defines a high-power mode of the adder circuit 200. In this second implementation, the selection mux 224 is used to pass the second sum 222 as an output 226 of the adder circuit 200.

The first adder section receives the first and second inputs provided by the input processor 202 to generate a first sum using the low-power mode of the adder circuit (310). For example, the low-power adder section receives the inputs 102a, 102b, uses the adder 116 of adder logic 210 to add the inputs 102a, b, and generates the first sum 220. The sum 220 is passed by selection mux 224 as the output 226 based on mux control signal 215 indicating that the low-power mode is selected by the input processor 202.

Similarly, the second adder section receives the first and second inputs provided by the input processor 202 to generate a second sum 222 when the input processor 202 determines that the relationship between the first and second inputs satisfies the set of conditions (312). For example, the high-power adder section receives the inputs 102a, 102b, uses the adder 216 of adder logic 212 to add the inputs 102a, b, and generates the second sum 222, when attributes such as the respective sign and exponent values of inputs 102a, 102b satisfy the set of conditions. The sum 222 is passed by selection mux 224 as the output 226 based on mux control signal 215 indicating that the high-power mode is selected by the input processor 202.

In some implementations, the low-power adder section is: (i) located along a first data path 211 of the adder circuit 200; (ii) communicably coupled to the input processor 202 along the first data path 211 of the adder circuit 200; and (iii) communicably coupled to the selection mux 224 along the first data path 211 of the adder circuit 200. Likewise, the high-power adder section is: (i) located along a second data path 213 of the adder circuit 200; (ii) coupled to the input processor 202 along the second data path 213 of the adder circuit 200; and (iii) coupled to the selection mux 224 along the second data path 213 of the adder circuit 200.

In general, adder circuit 200 can be configured to locate a compare and swap logic before inputs are registered for an addition operation at the circuit. The adder circuit 200 can be fed from multipliers or from registers in an example computation unit. In some cases, the circuit 200 is configured such that certain logic used in adding inputs (e.g., registering inputs) is pushed or moved out of the critical path of the adder and into a multiplier that feeds the adder circuit 200.

Two separate data paths are used that each correspond to a respective low-power mode or high-power mode which the adder can operate in. A decision on which data path to use can occur very early in a compute cycle for an example addition operation. In some implementations, this decision can even be moved to a previous pipeline stage, e.g., at a prior multiplier, an ALU, or a bypass circuit of the computation unit, but will incur adjustments or modifications to an interface of the adder circuit. A zero input generator 208 is used to feed zeros to a low probability mode data path 213 of the circuit 200, unless a decision is made to use that mode (high-power mode) based on the set of conditions being satisfied, e.g., at least where inputs 102a and 102b are very close in magnitude or scale.

Figure 4:
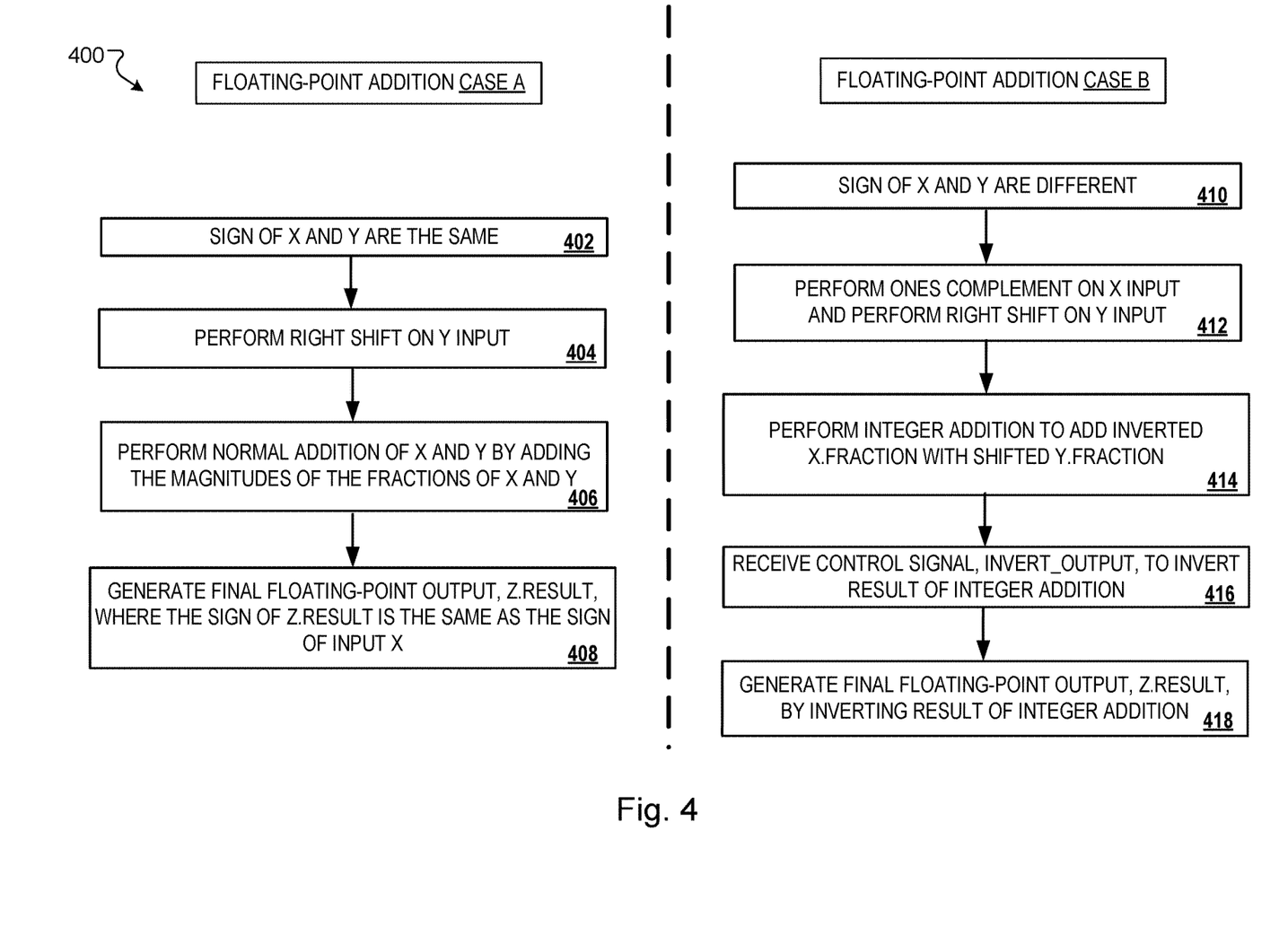
FIG. 4 shows a flowchart of an example process for adding two floating-point inputs.

FIG. 4 shows a flowchart of an example process 400 for adding two floating-point inputs. Process 400 can be performed using at least circuit 200 in combination with other circuits, components, and systems described in this document.

In an example implementation, circuit 200 includes a significand adder that computes Z.fraction=X.fraction+Y.fraction, where X and Y are respective inputs 102a and 102b and Z is an output of the circuit 200. X.fraction and Y.fraction can each correspond to a respective numerical fraction of a 32-bit floating-point number after appropriate shifting. In some cases, the adder logic 210 (e.g., adder circuit 116) receives another input that is a control signal, invert_output. This invert_output control signal corresponds to an operation for inverting, Z.fraction, which can be a result of an example significand adder, such as adder 116, before circuit 200 generates an example final output, Z.result, which corresponds to an actual floating-point addition result of the circuit 200.

For ease of description, and as shown at FIG. 2, data path 211 can generally represent a right hand side (RHS) of circuit 200, while data path 213 can generally represent a left hand side (LHS) of circuit 200. Based on the above descriptions, and using input processor 202, X (input 102a) always has a numerical value that is greater than a numerical value of Y (input 102b) at the input to adder logic 210 on the RHS. Because the LHS of the circuit 200 is separate from the RHS, this relationship of X being greater than Y can be guaranteed at the RHS. Because Y is less than X, Y will be right shifted before the fraction addition involving X and Y takes place. As discussed above, the right shift, or wide right shift, is performed to align the respective decimal points of each input before the circuit 200 uses the significand adder to add the inputs X and Y. Thus, Y is less than X.

This example implementation involves the following 2 cases: case a) the respective sign of inputs X and Y are the same; or case b) the respective sign of inputs X and Y are different (e.g., an inversion case). As discussed below, case b) is an inversion case where the control signal, invert_output, will be used to invert the output, Z.fraction. As shown at FIG. 4, under case a), when the respective signs of X and Y are the same (402), the significand adder 116 at the RHS of adder circuit 200 is used to perform normal addition of X.fraction and Y.fraction. Because Y is less than X, Y will be right shifted before the fraction addition involving X and Y takes place (404). Hence, no inversion operation is needed because the addition operation performed by the circuit 200 involves just adding the magnitudes of the fractions of X and Y to generate a sum or final floating-point output, Z.result (406). A sign of the final floating-point output, Z.result, of the adder circuit 200 will be the same as the sign of the input X (408).

As shown at FIG. 4, under case b), the respective signs of X and Y are different (410). However, X always has a numerical value that is greater than a numerical value of Y at the input to adder logic 210 on the RHS. As described above, the input processor 202 can route inputs X and Y to the LHS of circuit 200 in response to determining that a relationship between X and Y satisfies a set of conditions. For example, the relationship between X and Y satisfies the set of conditions when the respective sign of X and Y are different "AND" an exponent delta between the exponent of X and the exponent of Y is 0 or 1. Here, the AND corresponds to a logic operation used by input processor 202 to determine whether the attributes of X and Y satisfy the set of conditions.

Thus, for the RHS of circuit 200, when respective signs of X and Y are different, X will always be greater than Y, as the difference between the respective exponents of X and Y will be at least 2. As noted above for case a), because Y is less than X, Y will be right shifted before the fraction addition involving X and Y takes place. When Y is already right shifted, adding additional twos complement logic to perform that operation on the Y operand can impact certain timing constraints of the addition operation. In view of this, the adder logic (or circuit) 210 is configured to perform a complement operation on the X input (412).

However, instead of generating the output, Z.fraction, by using the computation Z.fraction=X.fraction−Y.fraction, which will require another twos complement of the output sum, Z.fraction, to obtain a final floating-point output, Z.result, the adder logic 210 of circuit 200 is configured to generate the output based on the computation Z.fraction=(−(−X.fraction−1+Y.fraction)−1). This computational approach is the same as Z.fraction=(X.fraction'+Y.fraction)', which corresponds to Z.fraction=(ones complement of X.fraction+Y.fraction)ones complement (414). Thus, when the respective signs of X and Y are different, the circuit 200 is configured to: i) invert the X.fraction input, ii) keep the Y.fraction input as is after shifting, iii) perform integer addition using the inverted X.fraction input and Y.fraction input, and iv) then invert the output, Z.fraction, of the adder logic 210 (e.g., adder 116) to generate the final floating-point result, Z.result.

In some implementations, the adder circuit 116 of adder logic 210 includes an additional input port that receives a signal indicating when to invert the output, Z.fraction. For example, if X.fraction was inverted, then an external controller that controls operation of the adder logic (or circuit) 210 can detect that an inversion operation was performed on the X.fraction input and determine that the output, Z.fraction, will also need to be inverted. Based on this, the additional input port of the adder 116 of adder logic 210 can receive another input that corresponds to the control signal, invert_output (416). This control signal can be used by the adder logic/circuit 210 to invert the output, Z.fraction, and generate the final floating-point output, Z.result (418). A sign of the final floating-point output, Z.result, will be the same as the sign of the input X for the RHS of the circuit 200.

A number of embodiments have been described. Nevertheless, it will be understood that various modifications may be made without departing from the scope of the invention. For example, various forms of the flows shown above may be used, with steps re-ordered, added, or removed. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. An integrated adder circuit comprising:
   a first adder section configured to generate a sum of two inputs based on a first condition corresponding to a respective sign of the two inputs;
   a second adder section configured to generate a sum of the two inputs based on a second condition corresponding to the respective sign and a respective scale of the two inputs; and
   an input processor configured to generate a parameter signal that:
      controls selection of circuitry in the first adder section to generate the sum of the two inputs when the first condition is satisfied; and
      controls selection of circuitry in the second adder section to generate the sum of the two inputs when the second condition is satisfied,
   wherein the integrated adder circuit is configured such that a low-power mode corresponding to the first adder section is selected to add the two inputs at a substantially higher rate than a high-power mode corresponding to the second adder section, and
   wherein
      when the first condition is satisfied, the circuitry in the first adder section performs a right shift operation to generate the sum of adding the two inputs, and
      when the second condition is satisfied, the circuitry in the second adder section performs a left shift operation to generate the sum of adding the two inputs.

2. The integrated adder circuit of claim 1, wherein:
   the integrated adder circuit is a two-mode, dual-path integrated adder circuit comprising a split data path configuration; and
   each data path of the split data path configuration includes respective circuitry configured to generate a sum of adding two or more floating-point inputs.

3. The integrated adder circuit of claim 2, wherein:
   the first adder section is a low-power section;
   the second adder section is a high-power section;

a first data path of the split data path configuration is in the low-power section and includes adder logic corresponding to the circuitry in the low-power section; and when the first condition is satisfied, the adder logic in the low-power section is used to generate the sum of adding the two inputs.

4. The integrated adder circuit of claim 3, wherein:

a second data path of the split data path configuration is in the high-power section and includes adder logic corresponding to the circuitry in the high-power section; and when the second condition is satisfied, the adder logic in the high-power section is used to generate the sum of adding the two inputs.

5. The integrated adder circuit of claim 4, wherein:
the right shift operation is a wide right shift operation; and
the left shift operation is a wide left shift operation.

6. The integrated adder circuit of claim 4, wherein:
the circuitry in the high-power section experiences a negligible amount of circuit toggles when the first condition is satisfied and the low-power section generates the sum of adding the two inputs.

7. The integrated adder circuit of claim 6, wherein:
the circuitry in the high-power section experiences the negligible amount of circuit toggles because only zeros are routed along the second data path.

8. The integrated adder circuit of claim 1, wherein the first condition corresponds to at least one of:
a match between a respective sign of the two inputs; or
a difference between a respective exponent of the two inputs being greater than 1.

9. The integrated adder circuit of claim 8, wherein a scale is represented by an exponent value and the second condition corresponds to:
a difference between the respective sign of the two inputs; and
a difference between a respective exponent of the two inputs being less than or equal to 1.

10. A method performed using an integrated adder circuit, the method comprising:
generating, by an input processor, a parameter signal that controls selection of a first adder section of the integrated adder circuit when a first condition, corresponding to a respective sign of two inputs, is satisfied and
controls selection of a second adder section of the integrated adder circuit when a second condition, corresponding to the respective sign and a respective scale of the two inputs, is satisfied;
when the first condition is satisfied, selecting, by the input processor, a low-power mode corresponding to the first adder section to compute a sum of the two inputs;
computing, by the first adder section, the sum of the two inputs based on the parameter signal that is generated by the input processor when the first condition is satisfied, wherein computing the sum of the two input when the first condition is satisfied comprises performing, by the first adder section, a right shift operation to generate the sum of adding the two inputs; and
computing, by the second adder section, the sum of the two inputs based on the parameter signal that is generated by the input processor when the second condition is satisfied, wherein computing the sum of the two input when the second condition is satisfied comprises performing, by the second adder section, a left shift operation to generate the sum of adding the two inputs, wherein the integrated adder circuit is configured such that the low-power mode is selected to add the two inputs at a substantially higher rate than a high-power mode corresponding to the second adder section.

11. The method of claim 10, wherein:
the integrated adder circuit is a two-mode, dual-path integrated adder circuit comprising a split data path configuration; and
each data path of the split data path configuration includes respective circuitry configured to generate a sum of adding two or more floating-point inputs.

12. The method of claim 11, wherein:
the first adder section is a low-power section and the second adder section is a high-power section;
a first data path of the split data path configuration is in the low-power section and includes adder logic corresponding to circuitry in the low-power section; and
the method comprises, when the first condition is satisfied, using the adder logic in the low-power section to generate the sum of adding the two inputs.

13. The method of claim 12, wherein:
a second data path of the split data path configuration is in the high-power section and includes adder logic corresponding to circuitry in the high-power section; and
the method comprises, when the second condition is satisfied, using the adder logic in the high-power section to generate the sum of adding the two inputs.

14. The method of claim 13, wherein:
the right shift operation is a wide right shift operation; and
the left shift operation is a wide left shift operation.

15. The method of claim 13, wherein:
the circuitry in the high-power section experiences a negligible amount of circuit toggles when the first condition is satisfied and the low-power section generates the sum of adding the two inputs; and
the circuitry in the high-power section experiences the negligible amount of circuit toggles because only zeros are routed along the second data path.

16. The method of claim 10, comprising, determining that the first condition is satisfied based on at least one of:
a match between a respective sign of the two inputs; or
a difference between a respective exponent of the two inputs being greater than 1.

17. A non-transitory machine-readable storage device for storing instructions for adding inputs using an integrated adder circuit, the instructions being executable by a processing device to cause performance of operations comprising:
generating, by an input processor, a parameter signal that controls selection of a first adder section of the integrated adder circuit when a first condition, corresponding to a respective sign of two inputs, is satisfied, and
controls selection of a second adder section of the integrated adder circuit when a second condition, corresponding to the respective sign and a respective scale of the two inputs, is satisfied;
when the first condition is satisfied, selecting, by the input processor, a low-power mode corresponding to the first adder section to compute a sum of the two inputs;
computing, by the first adder section, the sum of the two inputs based on the parameter signal that is generated by the input processor when the first condition is satisfied, wherein computing the sum of the two input when the first condition is satisfied comprises performing, by the first adder section, a right shift operation to generate the sum of adding the two inputs; and computing, by the second adder section, the sum of the two inputs based on the parameter signal that is generated by the input processor when the second condition is satisfied, wherein computing the sum of the two input when the second condition is satisfied comprises performing, by the second adder section, a left shift operation to generate the sum of adding the two inputs, wherein the integrated adder circuit is configured such that the low-power mode is selected to add the two inputs at a substantially higher rate than a high-power mode corresponding to the second adder section.

\* \* \* \* \*